United States Patent [19]

Erhardt

[11] Patent Number: 4,952,848
[45] Date of Patent: Aug. 28, 1990

[54] SIGNAL GENERATING CIRCUIT FOR BALLAST CONTROL OF DISCHARGE LAMPS

[75] Inventor: Robert A. Erhardt, Chicago, Ill.

[73] Assignee: North American Philips Corporation, New York, N.Y.

[21] Appl. No.: 215,697

[22] Filed: Jul. 5, 1988

[51] Int. Cl.$^5$ ............... H05B 41/36; H05B 37/02; G05F 1/00
[52] U.S. Cl. ................................ 315/307; 315/308; 315/DIG. 7; 315/277; 315/244
[58] Field of Search ......... 315/307, 308, 277, DIG. 7, 315/244, 82, 194, 209 R

[56] References Cited

U.S. PATENT DOCUMENTS 4,724,360 2/1988 Luursema ........................... 315/244

Primary Examiner—Eugene R. Laroche
Assistant Examiner—Ali Neyzari
Attorney, Agent, or Firm—Bernard Franzblau

[57] ABSTRACT

A ballast control apparatus for an electric discharge lamp comprises a first series circuit including a first winding of an AC supply voltage transformer, a first winding of a ballast transformer, a lamp current sensing resistor and the lamp. A current sensing transformer has a first winding parallel to the resistor. A second winding of the supply voltage transformer, the ballast transformer and the current sensing transformer are connected in a second series circuit. A signal voltage proportional to lamp power is derived by adding together the voltages induced in the three series-connected second windings. A second signal voltage proportional to lamp voltage is derived across the series combination of the second windings of the ballast transformer and the supply voltage transformer. The voltage induced in the second winding of the current sensing transformer is proportional to lamp current. A signal voltage indicative of the condition of the lamp load can be derived across the second winding of the ballast transformer. These three signal voltages are used to control a DC/AC inverter that energizes the lamp via the supply voltage transformer.

16 Claims, 3 Drawing Sheets

SIGNAL GENERATING CIRCUIT FOR BALLAST CONTROL OF DISCHARGE LAMPS

BACKGROUND OF THE INVENTION

This invention relates to a circuit for generating signal voltages useful in the control of a discharge lamp, and more particularly useful for controlling the power to a high-pressure discharge lamp operating as a headlight or fog lamp in a motor vehicle or the like.

In U.S. Pat. No. 4,724,360, issued Feb. 9, 1988, and hereby incorporated by reference, there is disclosed a circuit for operating a high-pressure discharge lamp (e.g. a high-pressure metal halide lamp) from a source of DC voltage, such as an automobile battery, by means of a direct voltage to alternating voltage converter. The converter-ballast circuit described therein is especially useful for operating a headlight in an automobile or similar vehicle which uses a high-pressure discharge lamp as the headlight.

In a ballast system of the general type described in the aforesaid U.S. patent, it is necessary to control the open circuit voltage in order to insure that there is sufficient voltage available to produce reliable lamp ignition. It is also required to control the "run-up" current (i.e. the current delivered to the discharge lamp during the low arc voltage period that occurs prior to the steady state or normal lamp operating condition), and more importantly to control the steady state lamp power.

SUMMARY OF THE INVENTION

In order to accomplish the control functions mentioned above, it is useful to derive signals which indicate whether a load condition or an unloaded condition is present, the open circuit voltage in the case of an unloaded condition, the lamp voltage (for determining "run-up" conditions), and the lamp power. It is also desirable to have the signals isolated from the discharge lamp so that the lamp can "float" with respect to ground for safety and EMI reasons.

It is therefore an object of the invention to provide a circuit that produces isolated electric signals which indicate open circuit voltage, lamp ignition, lamp voltage and lamp power in an electronic ballast in order to control the operation of the ballast and lamp.

Another object of the invention is to provide a simple and inexpensive circuit for generating the required ballast control signals in an electronic ballast of the type including a push-pull inverter circuit and an inductive ballasting element.

A further object of the invention is to provide an electronic ballast for use with motor vehicle headlights (discharge lamps) which can control lamp power within a fairly narrow range despite substantial variations in temperature, input voltage and lamp voltage.

The above objects are achieved by means of a simple signal generating circuit comprising three transformers each of which has a secondary winding. The secondary windings of the three transformers are connected in series circuit and by means of the proper turns ratios and winding polarities signals are produced which provide all of the desired control information to operate the ballast and lamp.

The first secondary winding is a secondary winding of the ballast choke. In an open circuit condition (lamp off) there is no voltage across this winding, except for short duration ignition voltage pulses which can be filtered out. When the ballast circuit is loaded (lamp on) a voltage is present across the first secondary winding which is proportional to the ballast voltage. This signal voltage therefore indicates a loaded or unloaded condition of the electronic ballast.

The second secondary winding, which is connected in series with the first secondary winding (ballast choke winding), consists of a secondary winding on the push-pull transformer of the ballast inverter circuit. Since the lamp voltage is equal to the source voltage (i.e. the output voltage appearing across the push-pull transformer) minus the ballast choke voltage, the signal voltage across the first and second series connected secondary windings will be proportional to the lamp voltage if the turns ratios are the same and the winding polarities are correct.

In order to generate a signal which is approximately proportional to the lamp power, an approximation technique is used whereby a signal voltage which is proportional to the lamp (load) current is added to the signal which is proportional to the lamp voltage. The load current signal voltage is obtained by means of the secondary winding of a third transformer which has a primary winding connected across a small resistor connected in the lamp current path, i.e. the resistor is in series circuit with the lamp. The signal proportional to lamp power is generated by adding together the signal voltages proportional to lamp current and lamp voltage.

In the case of a load which appears resistive, power can be approximated over a limited voltage range by summing the load current and voltage scaled by proper constants. In order to provide satisfactory operation of a high-pressure discharge lamp used as a motor vehicle headlight, it is required to control the lamp power within a range of 6% for a ±20% variation in the lamp voltage. The circuit to be described provides an error of only about 2% in the results of an adding operation, $K_1V + K_2I$, versus the customary VI product calculation of power, in the case of a 20% variation in lamp voltage.

In an unloaded condition where the signal voltages derived from the ballast choke and the lamp current sensing resistor are each zero, a signal proportional to the open circuit voltage can be sensed either across the push-pull transformer winding alone or across that winding in series with one or both of the other two windings.

If a capacitor is used in series with the ballast inductor, as in U.S. Pat. No. 4,724,360, it is possible to take account of its effect on the circuit by changing the ballast winding turns ratio by a factor $X_L/(X_L - X_c)$ where $X_L$ is the reactive impedance of the ballast choke and $X_c$ is the reactive impedance of the capacitor, assuming the lamp voltage and current waveforms are approximately sinusoidal.

BRIEF DESCRIPTION OF THE DRAWING

The invention will now be described in greater detail by reference to the accompanying drawings in which FIG. 1a shows a modification of a part of the circuit in FIG. 1.

DESCRIPTION OF THE PREFERRED EMBODIMENTS

Figure 1:
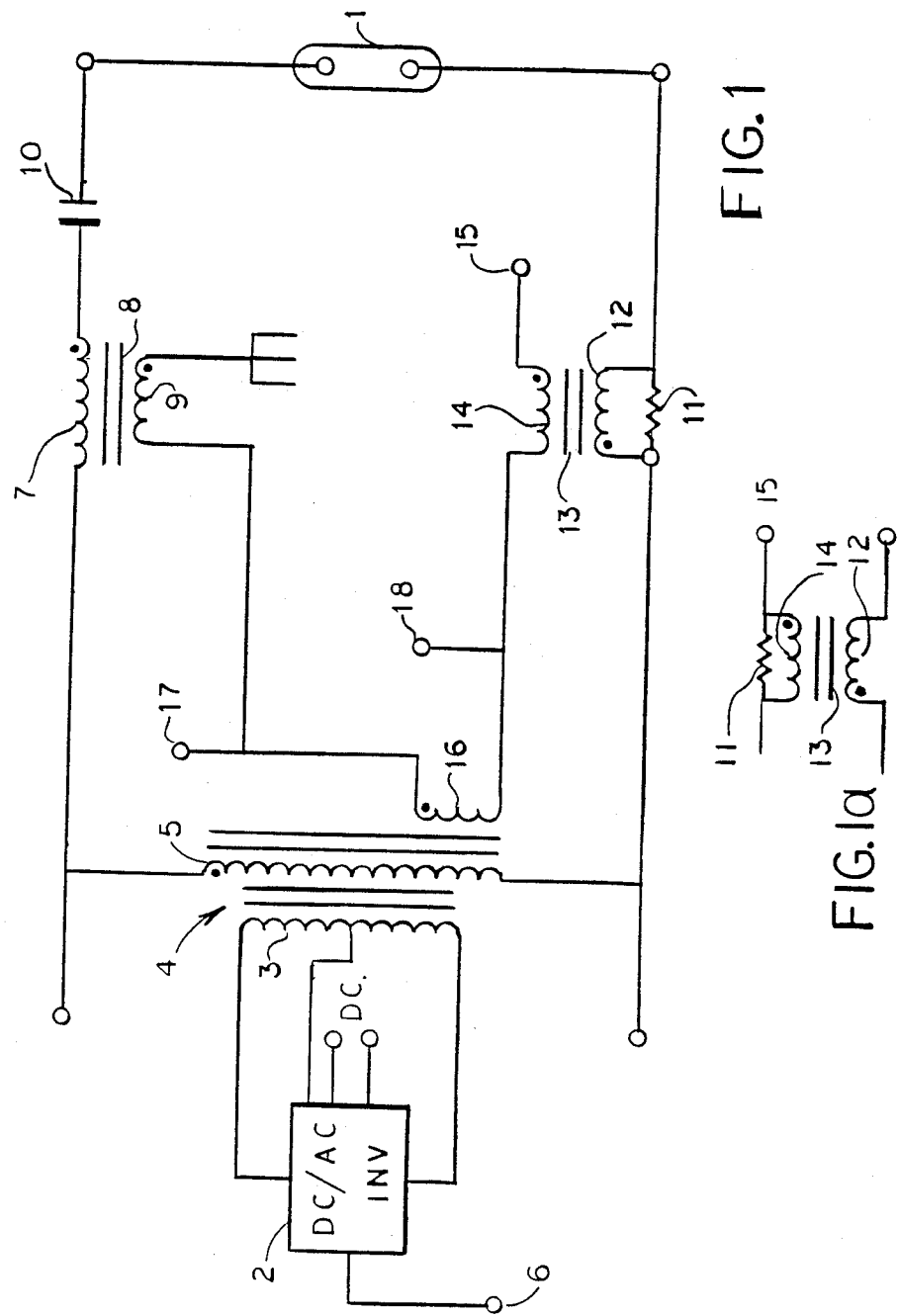
FIG. 1 is a schematic circuit diagram illustrating a first embodiment of the invention.

FIG. 1 shows the basic combination of elements for carrying out the invention. The system to be described may be used to operate a low power (35 W) metal halide lamp 1 having an argon fill gas for use as an automobile fog lamp. This type of lamp has an arc voltage of 85 V ±20% and requires a voltage ignition pulse of at least 1.5 KV peak with a source voltage of 300 V rms for reliable ignition of the lamp. The lamp also needs a current of at least 1.25 amps rms immediately after ignition in the case of a cold start and for an acceptably short "run-up" time.

In this system it is necessary to control the open circuit voltage (for lamp ignition), the lamp "run-up" current, i.e. the current delivered to the discharge lamp during the low arc voltage period prior to steady state lamp operation, and the steady state lamp power.

In order to accomplish the foregoing it is desirable to derive signals which indicate a loaded or unloaded condition, the open circuit voltage in the unloaded condition, lamp voltage (for determining run-up conditions), and lamp power. It is also desirable to have these signals electrically isolated from the lamp so that the lamp can be floating with respect to ground for safety reasons and to inhibit radiated EMI.

It is generally known that power can be determined by taking the product of voltage and current. The lamp power control in this system operates on the assumption that lamp power over a limited range of lamp voltage can be approximated by summing the lamp voltage and lamp current modified by appropriate constants. It can be shown that for a variable resistive load that the relationship $(1.4)(I)+(0.005)(V)=1$ provides a maximum error of about ±2% when compared with a constant 35 W over the voltage range from 80 V to 120 V. Similar levels of error have been found for lamp loads.

A signal proportional to $(1.4)(I)+(0.005)(V)$, i.e. lamp power, is generated by using the secondary windings on the oscillator transformer and ballast choke for the lamp voltage signal and a sense resistor and transformer for the current signal. The various windings are connected in series to produce the desired "power" signal.

In FIG. 1, a DC/AC inverter 2 is connected to a source of DC supply voltage, e.g. an automobile battery, via input terminals at DC. The inverter supplies a sinusoidal AC signal to a primary winding 3 of an output transformer 4 having a first secondary winding 5 for supplying AC power to the lamp load. The DC/AC inverter could be of several types, and could have a transformer coupled output or a simple inductor coupling. A sine wave inverter is preferable. The power delivered by the inverter is controlled via a DC control input terminal 6. The ballast is controlled by controlling the DC input to the DC/AC inverter by means of a controlled DC/DC stage. This stage may be a boost converter, but could also be of another type.

The AC voltage induced in winding 5 is supplied to the discharge lamp 1 via a series circuit consisting of a ballast coil 7, which is the primary winding of a transformer 8 having a secondary winding 9 having one end connected to ground, a DC blocking capacitor 10 and a lamp current sensing resistor 11. The capacitor 10 in series with the inductor 8 is optional, its function being to prevent lamp rectification. The effect of the capacitor 10 on the control voltage developed at terminal 15 can be taken into account by a judicious choice of the winding turns ratio of ballast transformer 8.

A primary winding 12 of a current sensing transformer 13 is connected in parallel with the current sensing resistor 11. The transformer 13 has a secondary winding 14 connected to an output control terminal 15 at which a voltage $V_c$ appears. The voltage $V_c$ relative to ground is indicative of lamp power. Alternatively, lamp current may be sensed by means of the modified circuit shown in FIG. 1a where the resistor 11 is connected in parallel with the secondary winding 14 of transformer 13, rather than in parallel with the primary winding 12, as in FIG. 1. This configuration has the advantage that the "sense" resistor 11 now has a higher resistance value. This type of resistor is more readily available.

The inverter output transformer 4 has a further secondary winding 16 connected in series circuit with the secondary windings 9 and 14 between ground and output control terminal 15.

In the open circuit condition, i.e. before ignition of the discharge lamp, no voltage is induced in secondary winding 9 (except for short duration ignition pulses) since there is no current flow in the primary winding 7. When the circuit is loaded, i.e. the lamp is in its operating state, a voltage is produced across winding 9 which is proportional to the ballast voltage. This signal voltage, $V_A$, at terminal 17 provides an indication as to the load condition, i.e. whether the lamp is on or off.

A voltage proportional to the source voltage is induced in the secondary winding 16 of the inverter output transformer 4. Since the lamp voltage is equal to the source voltage minus the ballast inductor voltage, the voltage developed across the series combination of the two secondary windings 9 and 16 will be proportional to the lamp voltage, assuming the turns ratios are the same and the winding polarities are correct. The winding polarities are indicated by the conventional dot symbols on the transformer windings.

In the operating condition of the lamp, the lamp current flows through resistor 11 to produce a voltage drop proportional to lamp current. Transformer 13 induces a signal voltage in the secondary winding 14 that is proportional to lamp current. Since the voltage developed across the series connected windings 9 and 16, i.e. the voltage between ground and terminal 18 is proportional to lamp voltage, and the voltage across series winding 14 is proportional to lamp current, the voltage appearing across all three series-connected windings, 9, 16 and 14, i.e. from ground to terminal 15, is approximately proportional to lamp power, given the assumptions described above. Thus, a signal voltage is generated at terminal 15 which is approximately proportional to lamp power by virtue of the addition of a signal voltage proportional to lamp voltage (windings 9, 16) and a signal voltage proportional to lamp current (winding 14).

In the unloaded condition (lamp off) the voltages developed by ballast inductor 7 and current sensing resistor 11 are both zero so that a signal indicative of the open circuit condition can be sensed across either winding 9 or 14. The level of the open circuit voltage can be obtained from the voltage across winding 16 or, since the voltages across windings 9 and 14 are nearly zero, across the series combination of windings 16 and 9, or 16 and 14 or across all three windings in series. Thus, a voltage $V_A$ at terminal 17 can provide an indication of a loaded or unloaded condition, a voltage $V_B$ at terminal 18 indicates the value of lamp voltage and a voltage $V_C$ at terminal 15 indicates lamp power.

Figure 2:
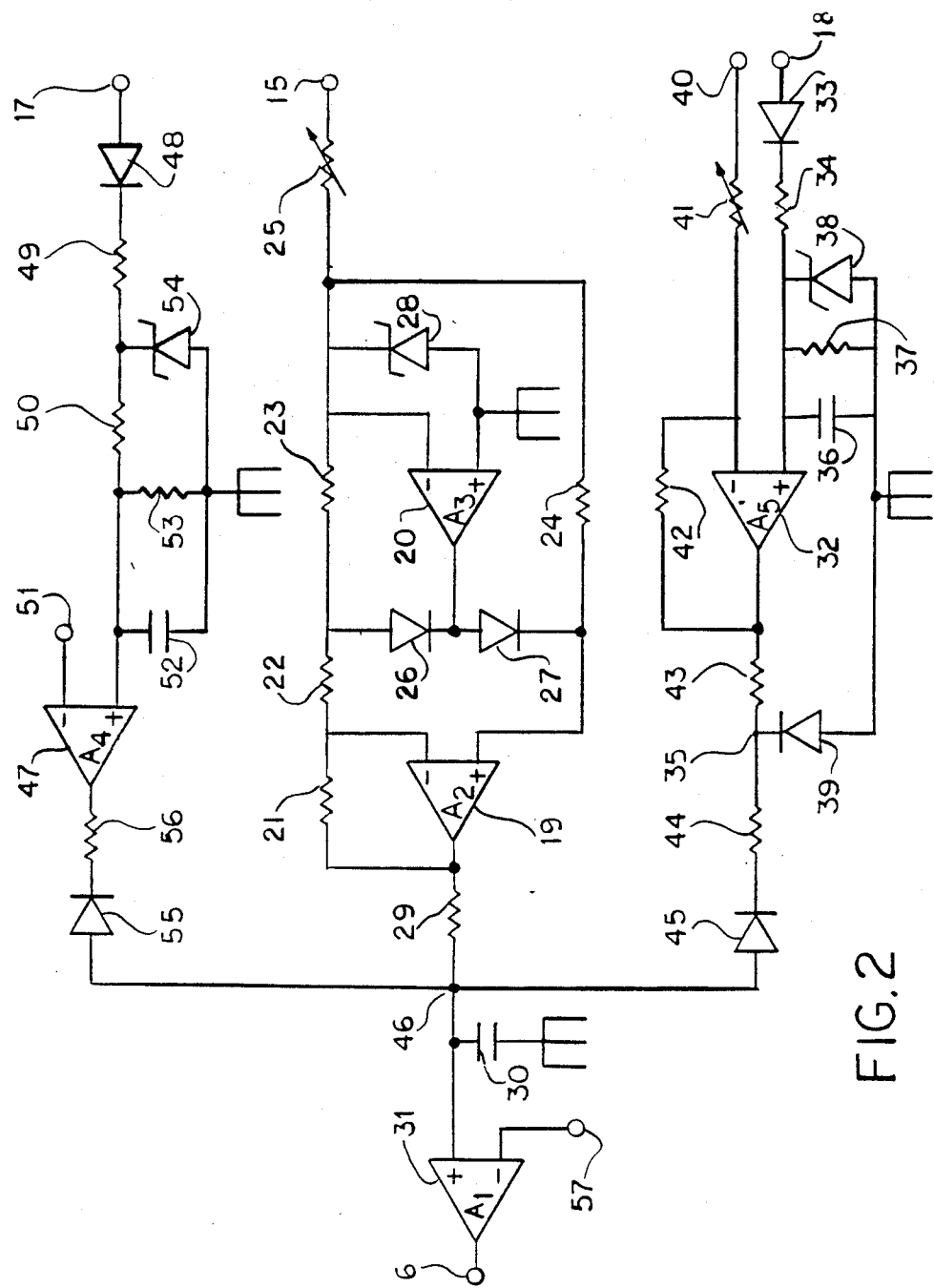
FIG. 2 is a schematic circuit diagram illustrating a control circuit for use in the invention.

FIG. 2 is a schematic diagram of the control circuits which are responsive to the control signals developed at terminals 15, 17 and 18 in the circuit of FIG. 1 in order to provide the control functions for the ballast and lamp. A control signal at output control terminal 6 is coupled to the control input terminal 6 of the DC/AC inverter 2 of FIG. 1.

During steady-state operation of the lamp, the signal $V_C$ at terminal 15 provides an indication of lamp power. The circuit consisting of amplifiers 19, 20, resistors 21–25 and diodes 26, 27 form a precision variable gain active rectifier circuit producing at the output of amplifier 19 a full-wave rectified version of the input signal $(K_1V + K_2I)$ at input terminal 15. The output signal of amplifier 19 can be filtered using a long time constant (e.g. approximately 100 ms). The resistor 25 is preferably a variable resistor by means of which the lamp power can be manually adjusted by adjusting the gain of the active rectifier circuit.

The gain of the active rectifier stage is equal to $R_5/R_6$ where $R_5$ is the resistance of resistor 24 and $R_6$ is the resistance of resistor 25, and where $R_5 = R_4 = R_3 = R_2$, where $R_4$, $R_3$ and $R_2$ are the resistance values of resistors 23, 22 and 21, respectively.

A Zener diode 28 protects the input circuit of amplifier 20 against any overvoltage. The full wave rectified output of amplifier 19 is filtered by means of resistor 29 and capacitor 30 connected in series between the output of the amplifier and ground. A DC control signal indicative of the lamp power level is thereby produced at the non-inverting (+) input of an output error amplifier 31. The control signal at terminal 46 is negative in the circuit described. However, if the circuit was modified to produce a positive control signal, then terminal 46 would be connected to the inverting(−) input of amplifier 31.

The inverting input (−) of amplifier 20 is connected to input terminal 15 via the variable resistor 25 and to its output via a series circuit of resistor 23 and diode 26. The non-inverting input of amplifier 20 is connected to ground. The inverting input of amplifier 19 is connected to the junction of resistor 23 and diode 26 via a resistor 22, and is also connected to its output via a feedback resistor 21. The non-inverting input of amplifier 19 is connected to the output of amplifier 20 via a diode 27 and to the inverting input (−) of amplifier 20 via resistor 24.

Although various known circuits could be used to implement the DC/AC inverter 2 (FIG. 1), a preferred apparatus consists of an up-converter preconditioner stage followed by a self-oscillating current-fed sinusoidal push-pull inverter. The current (power) delivered to the lamp is determined by a DC control voltage at the input of the push-pull inverter since the push-pull oscillator functions as an AC voltage source at the secondary winding 5 of output transformer 4 (FIG. 1). The AC voltage in secondary winding 5 is proportional to the DC input. The ballast element 7 then regulates current as a function of the AC voltage source. Lamp current is controlled by controlling the DC voltage in the up-converter stage of the DC/AC inverter 2.

During the low arc voltage lamp run-up phase, it is necessary to control the lamp current to provide an adequate run-up current. The relationship 1.4 I + 0.005V = 1 provides only about 640 ma of current at a low arc voltage of 20 volts, whereas 1.1 amps or more is required. It is therefore necessary to modify the gain of the active rectifier/filter stage to provide the necessary current at low arc voltages. This is accomplished by the lamp voltage monitoring circuit connected to input terminal 18. Terminal 18 receives the lamp voltage signal $V_B$ from terminal 18 of the circuit of FIG. 1.

Input terminal 18 is coupled to the non-inverting input of amplifier 32 via a series connected diode 33 and a resistor 34. The non-inverting input is connected to an output junction point 35 via the parallel circuit of capacitor 36, resistor 37 and Zener diode 38 connected in series with diode 39. The junction point of elements 36–39 is connected to ground. A reference voltage at terminal 40 is applied to the inverting input of comparator 32 via a variable resistor 41. A feedback resistor 42 connects the inverting input to the output, which in turn is connected to junction 35 via a resistor 43.

The output junction 35 is connected via a resistor 44 in series with a diode 45 to a common input junction point 46 for the error amplifier 31.

The lamp voltage signal at terminal 18 is peak detected by diode 33 and capacitor 36. The resistor 34 and the Zener diode 38 protect the input of comparator amplifier 32 from voltage transients. The gain of the rectifier-filter stage is modified during the run-up phase by controlling the gain of amplifier 32 by means of resistors 41 and 42. Thus, the lamp voltage is monitored and subtracted from the filtered output signal of the active rectifier stage when the lamp voltage drops below a predetermined level set by variable resistor 41.

When the lamp voltage is below the set point level the K term in the power expression K (1.4 I + 0.005V) = 1 is changed as a function of voltage, which has the effect of changing the slope of this expression whenever the lamp voltage is below the adjusted set point voltage. The slope is adjustable by adjusting the gain of the amplifier monitoring the lamp voltage. The maximum amount of attenuation is determined by resistor 44 and can be adjusted by making this resistor variable. If resistor 44 is variable, it can be used to adjust the run-up current during the low arc voltage phase of the lamp (lamp start-up).

In the open circuit condition (lamp off), the signal voltage at terminal 15 represents the open circuit voltage. During open circuit it is necessary to modify the power control loop because when the lamp current is zero, the power control loop will produce an open circuit voltage of approximately 170 volts rms, whereas a voltage greater than 300 volts rms is necessary at this time. It is therefore necessary to modify the loop gain in the open circuit condition so as to produce the desired 300 V rms.

The circuit for monitoring the open circuit condition is connected to input terminal 17 which receives the voltage $V_A$ indicative of the ballast coil voltage. In the case of an open circuit, the voltage $V_A$ at terminal 17 is nearly zero, except for short duration ignition pulses.

The terminal 17 is connected to the non-inverting input of comparator amplifier 47 via a series circuit consisting of a diode 48, a first resistor 49 and a second resistor 50. A reference voltage at terminal 51 is applied to the inverting input of amplifier 47. The non-inverting input is coupled via the parallel circuit of capacitor 52 and resistor 53 in series with a Zener diode 54 to the junction between resistors 49 and 50. The junction point of elements 52–54 is connected to ground. The output of comparator 47 is connected to input junction 46 via the series circuit of diode 55 and resistor 56.

The ignition pulses at terminal 17 are clipped by resistor 49 and Zener diode 54 and the signal voltage at this terminal is rectified by diode 48 and is filtered by resistors 50, 53 and capacitor 52 to produce a DC signal at the non-inverting (+) input of amplifier 47. This DC signal represents the ballast coil voltage.

In the open circuit condition, the DC signal is lower than the reference voltage at terminal 51, thus producing a low output voltage for comparator amplifier 47. This is operative to attenuate the signal at the common input junction 46, thus effectively decreasing the gain between the input terminal 15 and the signal input of error amplifier 31. By a proper choice of resistor 56 the open circuit voltage can be controlled to a value of 300 V rms.

In the loaded condition (lamp on), the signal voltage across capacitor 52 is greater than the reference voltage at terminal 51 which causes the output voltage of amplifier 47 to go high, thereby reverse biasing diode 55 and isolating the open circuit monitor from the error amplifier 31. In fact, during steady-state operation of the lamp, the outputs of amplifiers 32 and 47 are both high so that respective diodes 45 and 55 are both reverse biased to keep amplifiers 32 and 47 from influencing the operation of the control circuit.

In the case of the open circuit voltage there is a "step" response in the change of gain of the rectifier/filter stage. In the circuit for gain modification in the run-up phase the gain is varied to provide a smooth transition so that there will not be a visible step in the light output of the lamp when the transition occurs.

The full wave rectified output of amplifier 19 is filtered by resistor 29 and capacitor 30 to produce a DC signal indicative of the level of lamp power. This signal is compared in error amplifier 31 with a DC reference voltage at terminal 57. The resultant error signal at terminal 6 is then used as a control signal to control the output of the DC/AC inverter. If lamp power is too low, the error signal increases the DC control voltage and hence the lamp power is increased. If lamp power is too high, the opposite occurs. The error amplifier is compensated to ensure loop stability.

Figure 3:
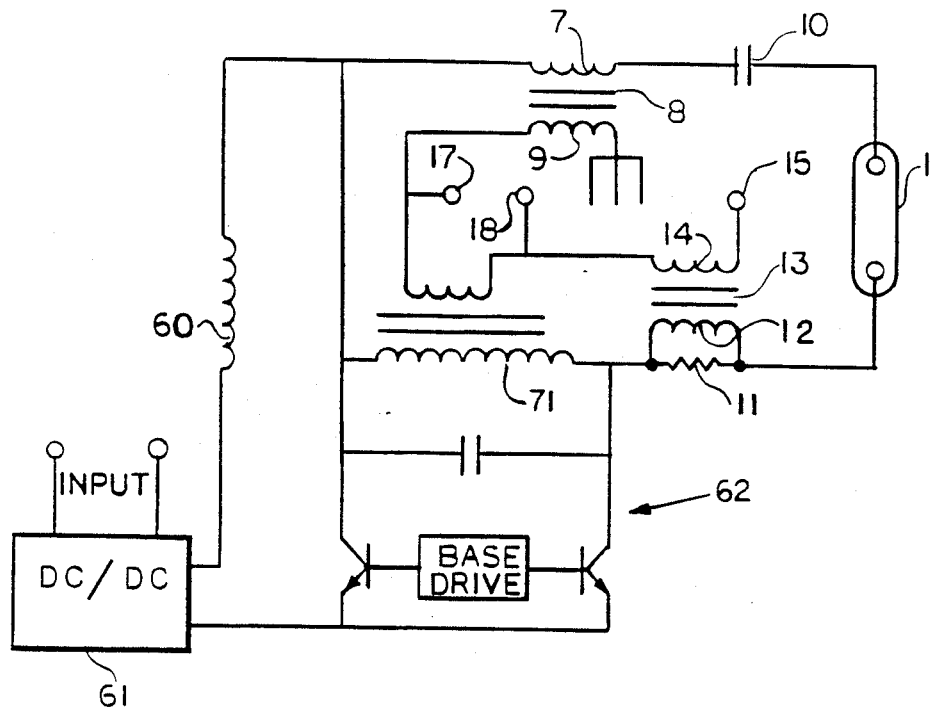
FIG. 3 is a schematic diagram of a second embodiment of the invention.

FIG. 3 shows a second embodiment of the invention which is a modification of the circuit shown in FIG. 1. The circuit of FIG. 3 uses a simple inductor 71 instead of a transformer at the AC output as in FIG. 1. Energy is supplied from a DC/DC inverter 61 via the inductor 60 to a resonant inverter 62. This current-fed push-pull circuit provides the same signal voltages at terminals 15, 17 and 18 as the circuit of FIG. 1 and operates in a similar manner in the development of these signal voltages.

Figure 4:
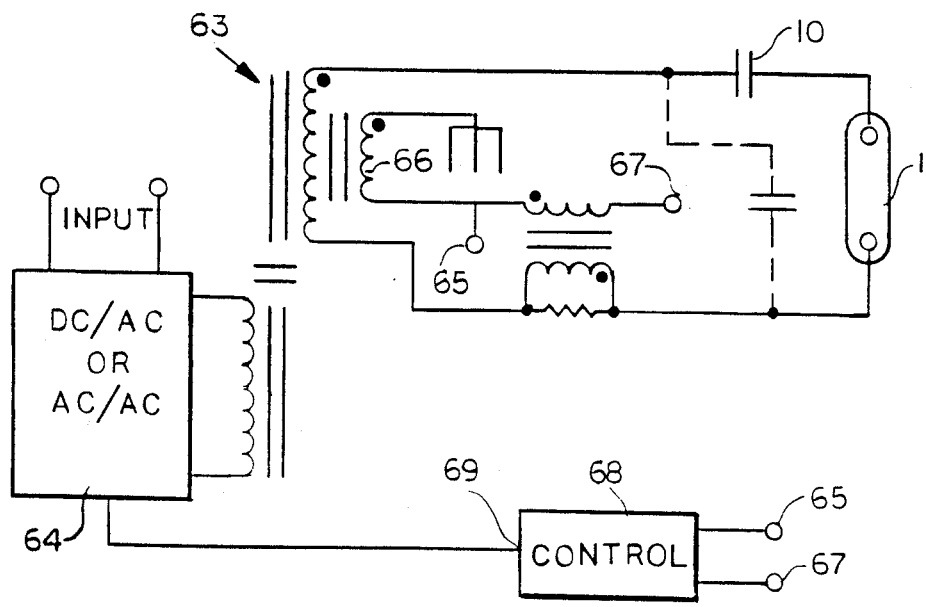
FIG. 4 is a schematic diagram of a third embodiment of the invention.

FIG. 4 shows a further modification of the circuit of FIG. 1 which now uses a leakage transformer 63 for coupling a DC/AC or AC/AC inverter 64 to the discharge lamp 1. In this apparatus a signal voltage is developed at terminal 65 which is indicative of the lamp voltage since the sense winding 66 is tightly coupled to the secondary winding of leakage transformer 63. Lamp current is sensed in the same way as in FIG. 1. A signal voltage is developed at terminal 67, relative to ground, which is approximately proportional to lamp power. The signal voltage appearing between terminals 65 and 67 can be used to provide an indication of the lamp load condition, i.e. whether the lamp is on or off.

The signal voltages developed at terminals 65 and 67 are applied to the inputs of a control device 68 which will function similar to the control circuit of FIG. 2 to derive a control signal at the output 69. This control signal is coupled to a control input of the inverter 64 so as to control lamp current or power. The inverter may control the lamp current by means of amplitude control of the primary.

A further capacitor 70 may be connected across the series connection of capacitor 10 and lamp 1, as indicated in broken lines. The capacitor 70 is optional and it functions to modify the waveform of the lamp current, i.e. to give it a more sinusoidal waveshape. The capacitor 70 is also designed to resonate with the leakage inductance of transformer 63 in order to generate a high voltage for ignition of the discharge lamp.

Although the invention has been described in connection with particular useful embodiments thereof, it will be apparent that various modifications can be made without departing from the spirit and scope of the invention.

I claim:

1. A ballast control apparatus for an electric discharge lamp comprising:
   a pair of output terminals for connection to a discharge lamp,
   a source of AC supply voltage for the lamp including a supply transformer having first and second magnetically coupled windings,
   a ballast inductor,
   a current sensing means including a second transformer having first and second magnetically coupled windings,
   means connecting said supply transformer first winding, said ballast inductor and said second transformer first winding in series circuit to said output terminals,
   a second winding magnetically coupled to the ballast inductor,
   means connecting the ballast inductor second winding, the supply transformer second winding and the second transformer second winding in a series circuit,
   a first control terminal for supplying a first signal voltage ($V_c$) derived from the summation of the voltages developed across the series combination of the three series-connected second windings, and
   a control circuit responsive to said first signal voltage for deriving a control signal determined by said first signal voltage, and wherein
   said AC supply voltage source is responsive to said control signal for controlling current supplied to the lamp via said supply transformer as a function of lamp power.

2. A ballast control apparatus as claimed in claim 1 further comprising a second control terminal for supplying to said control circuit a second signal voltage ($V_b$) proportional to lamp voltage and derived from the summation of voltages developed across the series combination of the supply transformer second winding and the ballast inductor second winding.

3. A ballast control apparatus as claimed in claim 2, wherein the control circuit includes means responsive to said second signal voltage for modifying said control signal when the second signal voltage is below a given voltage level indicative of a connected lamp in its run-up condition.

4. A ballast control apparatus as claimed in claim 3, further comprising a third control terminal connected to at least one of the three second windings at which is developed a third signal voltage indicative of lamp load condition,
   means for coupling the third signal voltage to said control circuit, and wherein
   the control circuit includes means responsive to said third signal voltage for further modifying said control signal when the third signal voltage is at a given level indicative of an open circuit condition of the lamp load.

5. A ballast control apparatus as claimed in claim 3, wherein said AC supply voltage source comprises a DC/AC inverter having an input coupled to a source of DC voltage and a control input for receiving said control signal from the control circuit.

6. A ballast control apparatus as claimed in claim 1, wherein said AC supply voltage source comprises a DC/AC inverter having an input coupled to a source of DC voltage and a control input for receiving said control signal from the control circuit, and said supply transformer includes a third push-pull winding which is part of a self-oscillating sinusoidal push-pull inverter of the DC/AC inverter.

7. A ballast control apparatus as claimed in claim 1, further comprising a capacitor connected in series circuit with the ballast inductor, the turns ratio of the ballast inductor to its magnetically coupled second winding being determined at least partly by the relationship $X_L/(X_L - X_c)$, where $X_L$ and $X_c$ are the reactive impedances of the ballast inductor and the capacitor, respectively.

8. A ballast control apparatus as claimed in claim 1, wherein said control circuit comprises a variable gain active rectifier/filter circuit coupled between an input terminal of the control circuit which receives said first signal voltage and a first input terminal of an error amplifier, means connecting a second input terminal of the error amplifier to a terminal for a source of reference voltage, and wherein said control signal is developed at an output of the error amplifier.

9. A ballast control apparatus as claimed in claim 4, wherein said control circuit comprises a variable gain active rectifier/filter circuit coupled between an input terminal of the control circuit which receives said first signal voltage and a first input terminal of an error amplifier, means connecting a second input terminal of the error amplifier to a terminal for a source of reference voltage, wherein said control signal is developed at an output of the error amplifier, and wherein said means for modifying and said means for further modifying of the control signal are coupled between second and third input terminals of the control circuit, respectively, and said first input terminal of the error amplifier, said second and third input terminals receiving said second and third signal voltages, respectively.

10. A ballast control apparatus as claimed in claim 1, wherein the current sensing means further comprises a resistor in parallel with one of said first or second windings of the second transformer, said apparatus further comprising a high-pressure discharge lamp coupled to said pair of output terminals.

11. A ballast control apparatus as claimed in claim 1 further comprising a second control terminal for supplying to said control circuit a second signal voltage ($V_b$) proportional to lamp voltage and derived from at least a voltage developed across the supply transformer second winding, and wherein the control circuit includes means responsive to said second signal voltage for modifying said control signal.

12. A ballast control apparatus as claimed in claim 1 further comprising a second control terminal for supplying to said control circuit a second signal voltage indicative of lamp load condition and derived from a voltage developed across the second winding of the ballast inductor or the second transformer, and wherein the control circuit includes means coupled to the second control terminal and responsive to said second signal voltage for modifying said control signal when the second signal voltage indicates an open circuit condition of the discharge lamp.

13. A ballast control apparatus for an electric discharge lamp comprising:
   a pair of output terminals for connection to a discharge lamp,
   a source of AC supply voltage for the lamp including a supply transformer having first and second magnetically coupled windings,
   means including a second transformer for sensing lamp current, said second transformer haVing magnetically coupled first and second windings,
   means connecting the supply transformer first winding and the first winding of the second transformer in a first series circuit to said output terminals,
   means connecting the supply transformer second winding and the second transformer second winding in a second series circuit between a point of reference potential and a first control terminal, whereby said first control terminal produces a signal voltage approximately proportional to lamp power,
   a second control terminal coupled to a junction point in the second series circuit between said second windings whereby a second signal voltage indicative of lamp voltage is produced at the second control terminal,
   a control circuit, responsive to the signal voltages at said first and second control terminals for deriving a control signal approximately proportional to lamp power and modifiable by the second signal voltage, and
   means coupling said control signal to a control input of said AC supply voltage source thereby to control the current supply to the lamp as a function of lamp power.

14. A ballast control apparatus as claimed in claim 13, wherein said source of AC supply voltage comprises an inverter circuit and said supply transformer comprises a leakage inductance transformer.

15. A ballast control, apparatus as claimed in claim 13, wherein the control circuit includes means responsive to said second signal voltage for modifying said control signal when the second signal voltage is below a given voltage level.

16. A ballast control apparatus as claimed in claim 15, wherein the control circuit further comprises a diode switch coupled to said modifying means so as to effectively inhibit the modifying means from having any effect on the control signal in the normal operating condition of the discharge lamp.

* * * * *